United States Patent [19]
Dahm

[11] 3,711,766
[45] Jan. 16, 1973

[54] METHOD AND APPARATUS FOR USE IN MEASURING RESULTANT TENSION FORCES IN STEEL STRIP BY SEQUENTIALLY ESTABLISHING FLUX PATHS ACROSS SAID STRIP

[75] Inventor: John R. Dahm, Pittsburgh, Pa.

[73] Assignee: Jones & Laughlin Steel Corporation, Pittsburgh, Pa.

[22] Filed: March 2, 1970

[21] Appl. No.: 15,452

Related U.S. Application Data

[63] Continuation-in-part of Ser. No. 773,500, Nov. 5, 1968, abandoned.

[52] U.S. Cl. ............................................. 324/34 ST
[51] Int. Cl. ............................................. G01r 33/12
[58] Field of Search ..324/34 ST, 34 R; 73/88.5, 133, 73/DIG. 2

[56] References Cited

UNITED STATES PATENTS

| | | | |
|---|---|---|---|
| 2,370,845 | 3/1945 | Davis | 324/34 ST |
| 3,184,963 | 5/1965 | Dahle | 324/34 ST |
| 3,247,453 | 4/1966 | Quittner | 324/37 |
| 3,311,818 | 3/1967 | Quittner | 324/34 ST |
| 3,535,625 | 10/1970 | Pratt | 324/37 |

FOREIGN PATENTS OR APPLICATIONS

| | | | |
|---|---|---|---|
| 145,045 | 3/1961 | U.S.S.R. | 324/34 ST |

Primary Examiner—Robert V. Corcoran
Attorney—T. A. Zalenski and G. R. Harris

[57] ABSTRACT

A series of sets of magnetic flux flow paths are sequentially established and passed through a ferromagnetic steel strip being rolled under tension. Each set of paths in the series acts to develop a resultant magnetic flux which is a measure of the average tension in the rolling direction in that portion of the strip through which a particular set of paths passes. The series of sets of paths are established in abutting relation across the width of the strip so that all stresses in the strip across its width are taken into account. A profile across the width of the strip of the magnitude of the applied tension forces in the strip in the rolling direction is thereby obtained, and the profile is used to determine strip flatness.

7 Claims, 9 Drawing Figures

INVENTOR.
JOHN R. DAHM
BY
his ATTORNEY

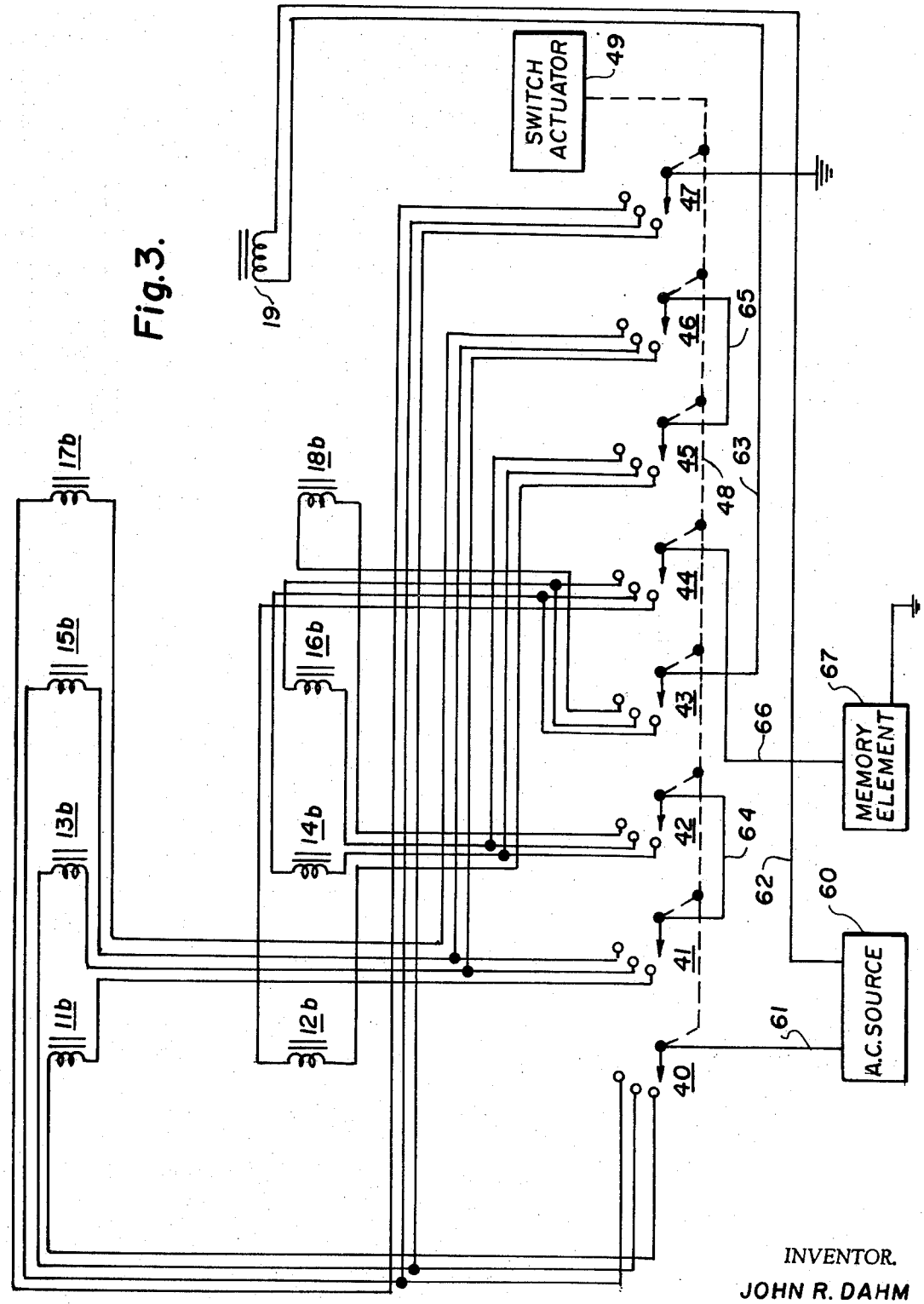

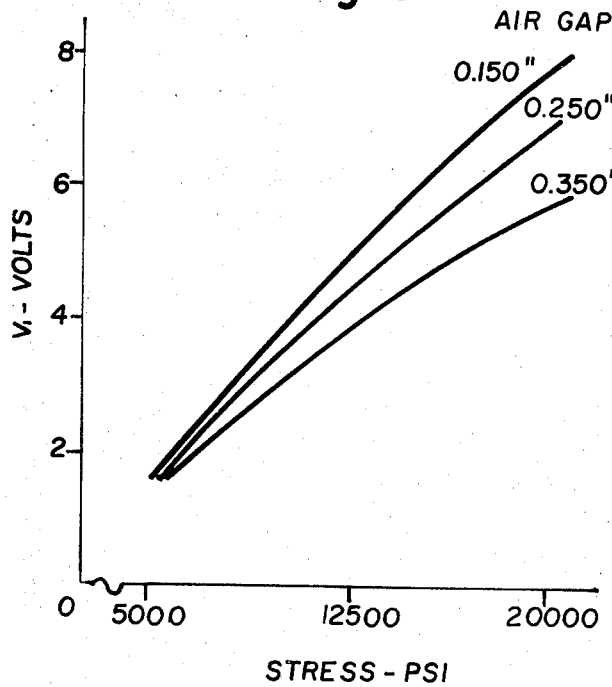
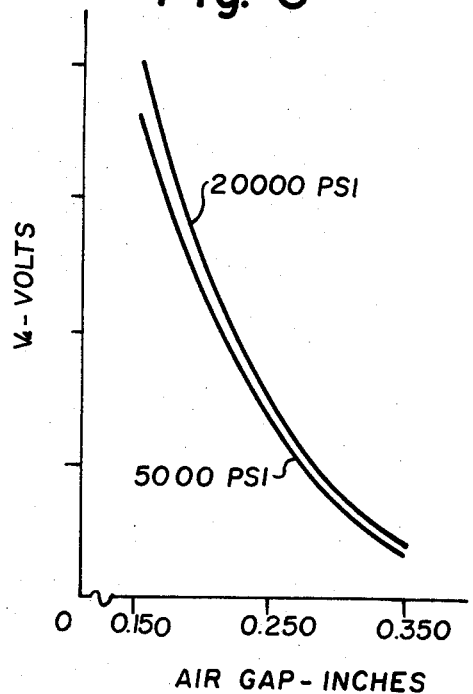
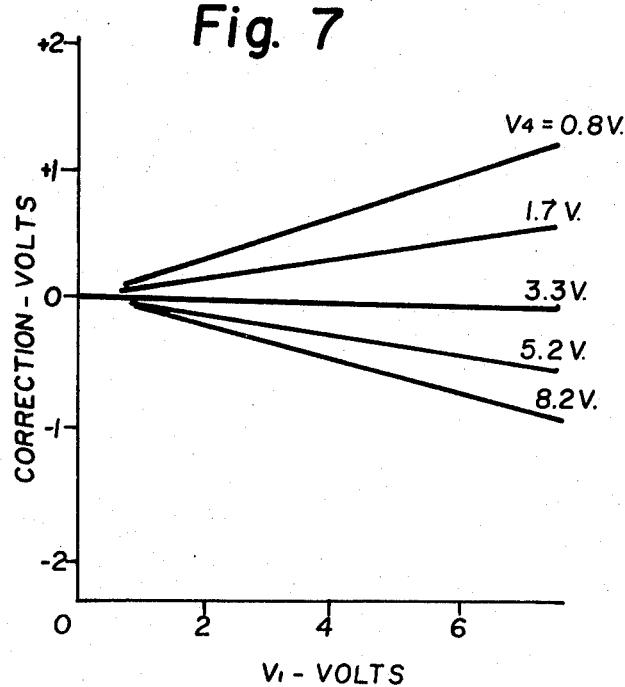

METHOD AND APPARATUS FOR USE IN MEASURING RESULTANT TENSION FORCES IN STEEL STRIP BY SEQUENTIALLY ESTABLISHING FLUX PATHS ACROSS SAID STRIP

This application is a continuation-in-part of U.S. Pat. application Ser. No. 773,500, filed Nov. 5, 1968 now abandoned.

This invention relates generally to improvements in method and apparatus for obtaining a representative measure of the resultant mechanical stresses in a particular direction between two spaced locations along a ferromagnetic material, and, more particularly, the invention relates to improvements in method and apparatus for measuring the tension forces in a ferromagnetic steel strip across its width, during the cold rolling thereof.

In U.S. Pat. application Ser. No. 707,793, filed Feb. 23, 1968 now abandoned, I disclose method and apparatus for measuring stresses in a ferromagnetic material. The invention is based on the phenomenon that the magnitude of a magnetic field acting on a magnetic material is influenced by mechanical stresses in the material in the region of the field. The stress sensing devices described therein include magnetic means to establish magnetic flux flow paths in the ferromagnetic material in two directions at right angles to one another and additional means for determining the resultant flux flow developed by said paths whereby the magnitude of a stress applied to the material in one of said two directions is ascertained. In a particular application of the invention, the tension forces present across the width of a moving steel strip undergoing cold rolling are determined by positioning a plurality of the sensing devices across the width of the strip.

Each device provides a representative measure of the tension forces in the rolling direction present in that section of the strip with which it is in line. Any portion of the strip not passing in line with a sensing device is not included in the measurements so made, and because it is preferable to space adjacent devices apart by several inches to prevent magnetic interaction therebetween, a measurement of the tension forces across the strip does not take into account all portions of the strip. Even where the devices are arranged in line across the strip in abutting relation, their physical configuration prevents those portions of the strip passing between adjacent devices from being sensed.

In some instances it is preferred to obtain a representative measure of the tension in the strip at a maximum number of locations across its width and to include in the measurements all portions of the strip width so that a more complete characterization of the distribution of tension forces across the strip is available.

Thus, it is an object of the invention to provide method and apparatus for use in providing a representative measure of the stresses of particular directionality existing between spaced locations in a ferromagnetic material, taking into consideration all such stresses between said spaced locations. Another object of the invention is to provide method and apparatus for measuring the tension in the rolling direction applied to a steel strip across its width as it is unwound from a coil, cold rolled and rewound into a coil under tension. A further object of the invention is to provide such method and apparatus whereby the shape of the strip is determined. Another object of the invention is to provide such method and apparatus which in addition corrects for magnetic anisotropism in the material. Yet another object of the invention is to provide method and apparatus for making the aforementioned measurements without physically contacting the material and where the size of the air gap between the apparatus and the material is subject to change.

These and other objects and advantages of the present invention will be apparent from the following description of an embodiment thereof with reference to the accompanying drawings in which:

FIG. 3 is a schematic circuit diagram of an electrical circuit used with the sensing device.

Figure 1:
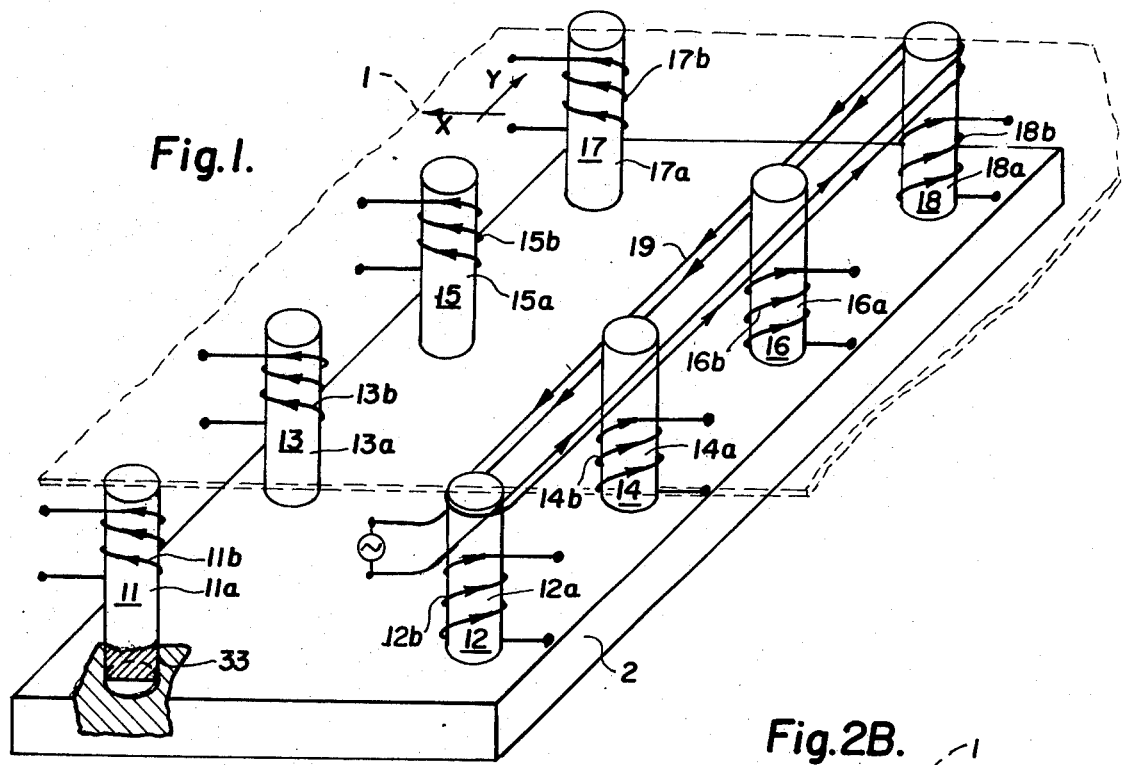
FIG. 1 is a perspective view of a stress sensing device according to the present invention, shown in operative position beneath a moving ferromagnetic steel strip.

FIGS. 5, 6, and 7 are a series of curves which relate stress in a strip to the air gap between the strip and a stress sensing device.

As with my invention described in the aforementioned U.S. Pat. application Ser. No. 707,793, the present invention can be applied to determine steel strip shape during the cold rolling thereof by measuring the variation in the tension forces across the width of the strip as it leaves the final stand and is wound on a recoil reel; the invention is described herein relative to such application. It is to be understood, however, that the use of the invention is not so limited but that it can be applied generally where a determination of the magnitude of the stresses of particular directionality present in a ferromagnetic material is desired.

In a cold reduction mill of ordinary construction, the steel strip as it leaves the final stand is wound on a recoil reel under tension. The stress sensing device of the present invention is positioned beneath the strip between the final stand and the recoil reel. The device is operated to sequentially establish across the width of the strip sets of magnetic flux flow paths passing through the strip. Each set of paths established includes paths passing through the strip in the rolling direction and in the direction transverse thereto. The paths coact to produce a resultant magnetic flux density which induces a secondary voltage in the device. The secondary voltage provides a representative measure of the tension applied to the strip in the rolling direction and by referring each of the secondary voltages sequentially induced to a curve defining the relationship between tension and induced voltage for steel of the type being rolled, the representative tension in the strip at a plurality of locations across the strip is noted. A profile of the magnitude of the applied tension forces across the width of the strip is thereby obtained.

The tension profile can be used to determine strip flatness. Thus, if, for example, the tension forces are uniform along the strip edges and greater at the strip center, this would mean that the strip edges are being stretched in the direction of rolling to a lesser extent than the strip center as the strip is wound, and that consequently the strip is longer along its edges than its center. This differential elongation of the strip is a result of the strip being reduced to a greater extent along its edges than along its center so that buckles and waves form in the strip and it is said to have poor shape. The strip is pulled flat as it is rolled and wound under tension, and thus its shape is not discernible at that time. However, by means of the present invention, differential reduction of the strip can be recognized during rolling by a consideration of the distribution of the tension forces in the strip in the rolling direction resulting from the strip being rolled and wound under tension. Consequently, immediate corrective action can be taken so that a minimum of the trip is reduced under poor operating conditions.

A more detailed description of the relationship between the shape or flatness of steel strip and the relative tension forces present in the strip as it is rolled under tension is included in previously mentioned Pat. application Ser. No. 707,793.

Referring now to FIG. 1, the sensing device of the present invention is illustrated in operative position beneath and spaced from a steel strip 1 shown in dashed lines. The device comprises a base plate 2 of soft iron upon which are perpendicularly mounted a first row of aligned magnetic core and coil arrangements 12, 14, 16 and 18 and a parallel, second row of aligned magnetic core and coil arrangements 11, 13, 15 and 17. Pairs of the arrangements, 11 and 12, 13 and 14, 15 and 16, and 17 and 18, each lie on a line perpendicular to the two rows of arrangements. Adjacent pairs of arrangements, e.g., 13 and 14 and 15 and 16, are spaced apart a distance equal to the distance between the two rows. The device extends completely across the width of the strip such that the arrangement pair 11 and 12 is substantially in line with one edge of the strip and arrangement pair 17 and 18 is substantially in line with the other edge of the strip. The strip passes over the sensor in the X or rolling direction shown on the figures of the drawings. This is also the direction in which tension is applied to the strip as it leaves the final stand and is wound on the recoil reel. The direction transverse to the rolling direction is illustrated by the arrows in the drawings as the Y direction.

Each magnetic core and coil arrangement consists of a cylindrical soft iron core or pole piece, indicated by reference numerals 11a, 12a, 13a, 14a, 15a, 16a, 17a and 18a, and a respective identical winding, indicated by reference numerals 11b, 12b, 13b, 14b, 15b, 16b, 17b and 18b. As exemplified by arrangement 11 in FIG. 1, each core is secured to base plate 2 by force-fitting one end thereof into a mating hole 33 in said base plate. The ends of the cores can be threaded and mating tapholes provided in the base plate to permit mounting of the cores to the base plate. The pole pieces are of equal height so that the end surfaces of their free ends lie in a common plane parallel to base plate 2.

From the foregoing, it will be understood that each core is physically joined by magnetically conductive material to the core adjacent to it in its row and to a core in the opposite row with which it and the coils associated therewith form a magnetic core and coil arrangement pair. The cores in each arrangement pair are so positioned with relation to one another that the line formed by the intersection of a plane entirely containing the longitudinal axes of both cores with said common plane is at a right angle to the line formed by the intersection of a plane entirely containing the longitudinal axes of all cores in either of said rows with said common plane.

The windings are connected to a source of alternating electric power in a manner more fully described below so that the current in each is caused to flow in the direction of the arrows shown thereon. In addition, electrical control circuitry, also more fully described below, is provided to sequentially energize diagonally opposed arrangements of two adjacent pairs of arrangements from one end of the sensor to the other as the strip passes overhead. Each set of diagonally opposed arrangements comprises an arrangement couple. Thus, initially, arrangement 11 of the first pair of arrangements 11 and 12 and diagonally opposed arrangement 14 of adjacent pair of arrangements 13 and 14 are energized so that each establishes a pair of magnetic flux flow loops, one loop of each pair passing through the strip in the X direction and the other loop of each pair passing through the strip in the Y direction. The X-directional loop of each pair of loops passes through one of the arrangements 12 and 13 with the Y-directional loop of the other pair of loops in opposite directions to produce resultant fluxes in the cores of the arrangements. The sum of the voltages induced in the coils of arrangements 12 and 13 by the resultant fluxes is a measure of the applied tension in the portion of the strip passing between arrangement pairs 11 and 12 and 13 and 14. Thereafter the power to arrangements 11 and 14 is cut off, dissipating the magnetic flux flow paths previously established, and arrangements 13 and 16 are energized, setting up sets of magnetic flux flow paths passing through the strip in a manner similar to that in which the paths established by arrangements 11 and 14 passed through the strip. The magnetic flux flow currents established by arrangements 13 and 16 also coact to induce voltages in arrangement windings 14b and 15b. The sum of the voltages is a measure of the applied tension in the portion of the strip passing between arrangement pairs 13 and 14 and 15 and 16. Thereafter, the power to arrangements 13 and 16 is cut off and arrangements 15 and 18 are energized, establishing sets of magnetic flux flow paths similar to those already established and inducing voltages in windings 16b and 17b, the sum of which is a measure of the applied tension in the portion of the strip passing between arrangement pairs 15 and 16 and 17 and 18. In this manner a representative determination of the magnitude of the applied tension forces in the rolling direction across the width of the strip at a plurality of locations is made, based on all such tension forces in the strip from one strip edge to the other.

The sensing device also includes a bias winding 19 which encircles all of the cores 12a, 14a, 16a and 18a and which is appropriately connected to a source of alternating electrical power. The current flow in the winding 19 is in the direction shown by the arrows thereon so as to establish supplemental magnetic flux components in the strip in the rolling direction without affecting the flux density in the transverse direction. The function of the bias winding is to correct for strip magnetic anisotropy.

Figures 2A, 2B:
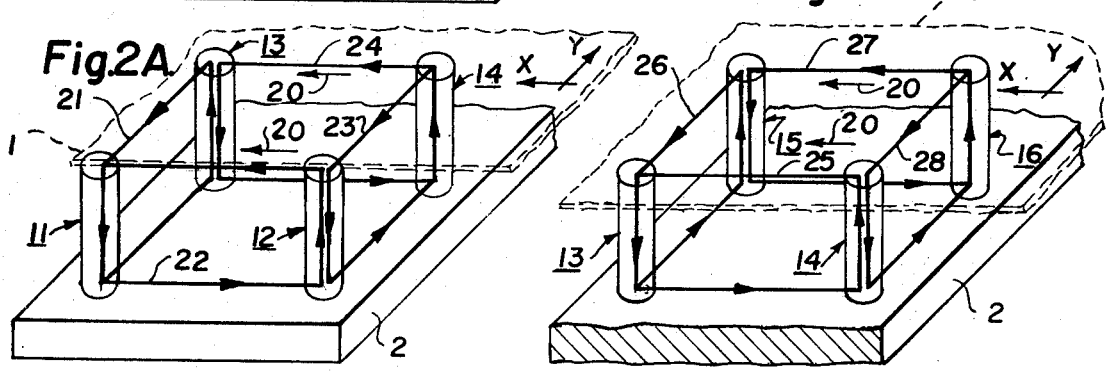
FIG. 2A is a partial perspective view of the stress sensing device illustrating the magnetic flux flow paths established by the device in conjunction with the steel strip in a first phase of operation.
FIG. 2B is a partial perspective view of the stress sensing device illustrating the magnetic flux flow paths established by the device in conjunction with the steel strip in a second phase of operation.
Figure 2C:
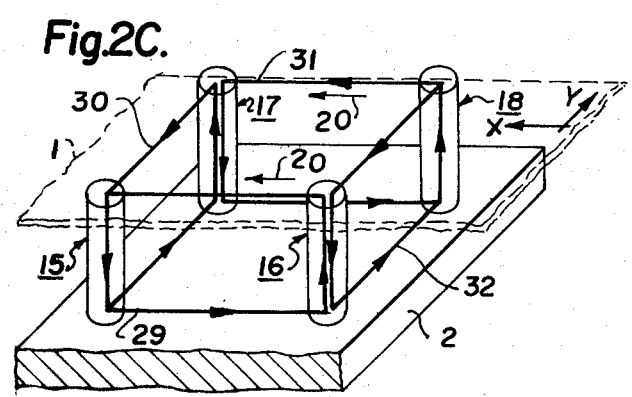
FIG. 2C is a partial perspective view of the stress sensing device illustrating the magnetic flux flow paths established by the device in conjunction with the steel strip in a third phase of operation.

The foregoing characterization of the sensing device will be more clearly understood from the following detailed operational description with reference to FIGS. 2A, 2B and 2C.

FIG. 2A illustrates the significant magnetic flux flow paths initially established when arrangements 11 and 14 are energized by an alternating electrical energy source. The windings have not been included on this figure nor on FIGS. 2B and 2C so that the magnetic flux flow paths can be more clearly illustrated in each.

The energizing of arrangement 11 establishes a first pair of closed loop, magnetic flux flow paths 21 and 22. The current flow through winding 11b is in a direction such that the end of the core 11a adjacent strip 1 constitutes the S-pole of the magnet. Both paths thus pass downwardly of core 11a. Path 22 then passes along base 2 to core 12a, upwardly of core 12a, across the air gap separating the face of core 12a and strip 1 and into strip 1 and then immediately along the strip edge in the X, or applied stress direction, back to core 11a. Path 21 after leaving core 11a passes along base 2 to core 13a, upwardly of core 13a, across the air gap and into the strip and then along the strip in the Y direction, or direction transverse to the direction of applied stress, back to core 13a.

The energizing of arrangement 14 similarly establishes a second pair of closed loop, magnetic flux flow paths 23 and 24. The current flow through winding 14b is in a direction such that the end of the core 14a adjacent strip 1 constitutes the N-pole of the electromagnet. Both paths thus pass upwardly of core 14a. Path 24 then passes across the air gap and into the strip, passing through the strip in the X direction. Thereafter, path 24 passes downwardly of core 13a, passing from core 13a back to core 14a along base 2. Path 23 after passing upwardly of core 14a and across the air gap into the strip, passes through the strip in the Y direction to core 12a, then down along core 12a and back to core 14a along base 2.

Flux flow paths 22 and 23 passing through core 12a in opposite directions produce a resultant magnetic flux density therein equal to the difference in their flux densities. The resultant flux density causes an electrical quantity in the form of a voltage to be induced in winding 12b. The voltage induced varies with the magnitude of the resultant flux and thus provides a measure of that flux. Similarly, flux flow paths 21 and 24 passing through core 13a in opposite directions produce a resultant magnetic flux density therein equal to the difference in their flux densities. A voltage corresponding to the resultant flux density is thereby induced in winding 13b.

Where the strip is magnetically isotropic, the density of a flux path depends on strip thickness, temperature, natural permeability and the applied tension as it affects the permeability. The effects of variations in thickness, temperature and natural permeability are significant compared to the effects of the applied tension so that if only a single flux path, established in the direction of applied stress, were used to measure the magnitude of the applied tension, variations in said applied tension would result in only small variations in a large signal. By employing two opposing flux paths, one in the direction of the applied stress and the other at right angles thereto, the constant part of the signal which is due to the influence of strip thickness, temperature and natural permeability is nulled and the resultant signals produced in windings 12b and 13b is a more sensitive measure of the applied tension. In addition, by negating the primary effects of strip thickness, temperature and natural permeability on the flux densities, no consideration need by given to the manner in which these properties vary through the length of the steel coil.

It can now be understood that when the strip is magnetically isotropic, the sum of the resultant voltages induced in windings 12b and 13b reflects the representative or average magnitude of the applied tension in the portion of the strip passing over the sensing device between core and coil arrangement pairs 11 and 12, and 13 and 14.

Often, the strip after cold rolling is magnetically anisotropic, however, and displays a higher magnetic permeability in the transverse direction than in the rolling direction. Consequently, when such strip is encountered, a resultant secondary voltage will be generated in windings 12b and 13b in the absence of any applies stress. As stress is applied and increased, the voltage in the windings decreases to zero and then increases with opposite phase. This effect is compensated for by the use of bias winding 19. Electrical current flowing in the winding in the direction shown in FIG. 1 establishes additional magnetic flux components in the strip in the direction of arrows 20—20. The additional flux supplements the flux in the strip in the direction of applied stress over that provided by arrangements 11 and 14 without affecting the flux density in the transverse direction Y, and thus compensates for strip anisotropy. By adjusting either the current level of the power supply to bias winding 19 or the number of turns in the winding, the resultant secondary outputs in windings 12b and 13b can be made zero in the absence of an applied stress.

After the voltages induced in windings 12b and 13b have been appropriately recorded, the electrical power to arrangements 11 and 14 is cut off and arrangements 13 and 16 are energized to establish a set of closed loop magnetic flux flow paths as shown in FIG. 2B. Arrangement 13 generates a pair of paths 25 and 26, like those previously generated by arrangement 11. Both paths pass downwardly of core 13a to base plate 2. Path 25 then passes along base plate 2 to core 14a, moving upwardly of the core across the air gap and into strip 1. From there it passes through the strip in the X direction back to core 13a.

Path 26 exiting from core 13a passes along base 2 to core 15a, upwardly of the core across the air gap and into the strip. It then passes along the strip in the Y direction back to core 13a.

Arrangement 16 generates a pair of paths 27 and 28 like those previously generated by arrangement 14. Both paths pass upwardly of core 16a across the air gap and into strip 1. Path 27 then passes along the strip in the X direction and then downwardly across the air gap into and downwardly of core 15a. Leaving the bottom of core 15a, path 27 passes along base plate 2 back to core 16a. Path 28 passes along the strip in the Y direction and then downwardly across the air gap into and downwardly of core 14a. From core 14a it passes along base plate 2 to core 16a.

The sum of the voltages induced in windings 14b and 15b by the resultant flux densities therein provides a measure of the representative or average tension forces in the section of the strip passing above the sensing device between arrangement pairs 13 and 14 and 15 and 16. Supplemental flux components 20 are again generated in the strip in the X direction to correct for anisotropy.

As with the first set of magnetic flux flow paths generated by arrangements 11 and 14, after the voltages induced in windings 14b and 15b have been noted, the electrical power to arrangements 13 and 16 is cut off. Arrangements 15 and 18 are then energized to establish a set of closed loop magnetic flux flow paths as shown in FIG. 2C.

Arrangement 15 generates a pair of paths 29 and 30 like those previously generated by arrangements 11 and 13. Thus, both paths pass downwardly of core 15a to base plate 2. Path 29 then passes along base plate 2 to core 16a, passing upwardly of the core across the air gap and into strip 1. From there it passes through the strip in the X direction back to core 15a. Path 30 as it leaves core 15a passes along base 2 to core 17a, upwardly of the core, across the air gap and into the strip. It then passes along the strip in the Y direction back to core 15a.

Arrangement 18 generates a pair of paths 31 and 32 like those previously generated by arrangements 14 and 16. Both paths pass upwardly of core 18a across the air gap and into strip 1. Path 31 then passes along substantially the edge of the strip in the X direction and then downwardly across the air gap into and downwardly of core 17a. Leaving the bottom of core 17a, path 31 passes along base plate 2 back to core 18a. Path 32 passes along the strip in the Y direction and then downwardly across the air gap into and downwardly of core 16a. From core 16a it passes along base plate 2 to core 18a.

The sum of the voltages induced in windings 16b and 17b by the resultant flux densities therein provides a measure of the representative or average tension forces in the section of the strip passing above the sensing device between arrangement pairs 15 and 16 and 17 and 18. Supplemental flux components 20 are generated in the strip in the X direction, again to correct for magnetic anisotropy.

After the voltages induced in windings 16b and 17b have been recorded, the electrical power to arrangements 15 and 18 is cut off. Arrangements 11 and 14 are then once again energized and the cycle of sequential energization of the arrangements, as described above, repeated. The cycle is repeated for any number of times desired. Typically, it is repeated for substantially the entire length of strip.

The three measurements made of the representative applied tension in the strip at each of the three locations where the sets of magnetic flux flow paths are established provides an indication of the distribution of the applied tension forces across the strip. It will be appreciated that because the successive sets of magnetic flux flow paths established during each cycle of sequential energization of core and coil arrangements from one strip edge to the other are immediately adjacent one another, all applied tension forces across the strip width are included in these measurements. Consequently, the tension distribution profile provided by these measurements is particularly characteristic of the actual tension forces in the strip. It will also be appreciated that an even more representative tension distribution profile is obtained by increasing equally the number of arrangements in each row of arrangements of the sensing device.

If the sensing device is tilted slightly with respect to the strip so that the plane common to all the core faces is not parallel to the strip, the air gaps for all the magnetic cores will not be the same. Consequently, the densities of the flux flow paths established will be affected differently by the different air gaps. However, by establishing each set of magnetic flux flow loops as described, each arrangement divides its flux between two other core and coil arrangements so that by adding the voltages induced in each of the windings of the latter, tilting of the sensing device is compensated for.

The electrical circuitry provided to sequentially establish sets of magnetic flux flow paths in the manner described above is illustrated schematically in FIG. 3. It includes multi-position switches 40, 41, 42, 43, 44, 45, 46 and 47, each having three operative positions. The switches are activated through line 48 by a switch actuator 49 so as to cyclically and simultaneously move at preset time intervals from a first operative position to a second operative position, then to a third operative position and then back to the first operative position.

One side of winding 11b is connected to the first operative position of switch 40 and the other side to the first operative position of switch 41. One side of winding 12b is connected to the first operative position of switch 44 and the other side to the first operative position of switch 45. One side of winding 13b is connected in parallel to the second position of switch 40 and the first position of switch 47 while the other side is connected in parallel to the second position of switch 41 and the first position of switch 46. One side of winding 14b is connected in parallel to the first position of switch 42 and the second position of switch 45 while the other side is connected in parallel to the first position of switch 43 and the second position of switch 44. One side of winding 15b is connected in parallel to the third position of switch 40 and the second position of switch 47. The other side is connected in parallel to the third position of switch 41 and the second position of switch 46. One side of winding 16b is connected in parallel to the second position of switch 42 and the third position of switch 45 and the other side is connected in parallel to the second position of switch 43 and the third position of switch 44. One side of winding 17b is connected to the third position of switch 46 and the other side to the third position of switch 47. One side of winding 18b is connected to the third position of switch 42 and the third position of switch 43.

An alternating current power source 60 supplies electrical energy to the sensing device to excite the core and coil arrangements. One side of the source is connected to switch 40 by line 61 and the other side is connected to one side of bias winding 19 by line 62. The other side of the bias winding is connected by line 63 to switch 43. Switches 41 and 42 are connected in series by line 64 and switches 45 and 46 are connected in series by line 65. A suitable memory element 67, such as a strip chart recorder, memory oscilloscope, digital computer or series of track and hold amplifiers, is connected to switch 44 via line 66.

It will now be understood that with the switches in the first operative position, electrical energy from source 60 flows in windings 11b and 14b and the sum of the voltages induced in windings 12b and 13b is delivered through line 66 to memory 67 where it is measured and stored. With the switches in the second operative position, electrical energy from source 60 flows in windings 13b and 16b and the sum of the voltages induced in windings 14b and 15b is delivered to memory 67 where it is measured and stored. With the switches in the third operative position, electrical energy from source 60 flows through windings 15b and 18b and the sum of the voltages induced in windings 16b and 17b is delivered to memory 67 where it is measured and stored. In this manner three sets of magnetic flux flow paths are sequentially established across the width of strip 1 and the resulting induced voltages measured in memory 67. Memory 67, thus, acts as measuring means for measuring in conjunction with the sequential delivery of alternating current to arrangement couples the current induced in the coils of the arrangements which with the arrangement couples comprise arrangement pairs.

If additional core and coil arrangements are provided so as to measure the tension in the strip at a greater number of points, the number of operative positions in each switch is increased so as to be equal to the number of sets of magnetic flux flow paths established.

The time interval the switches are in any one operative position is in the nature of a fraction of a second and is only long enough for a set of magnetic flux flow paths to be established, the voltages induced in the windings and the sum of the voltages delivered via line 66 to memory element 67.

Figure 4:
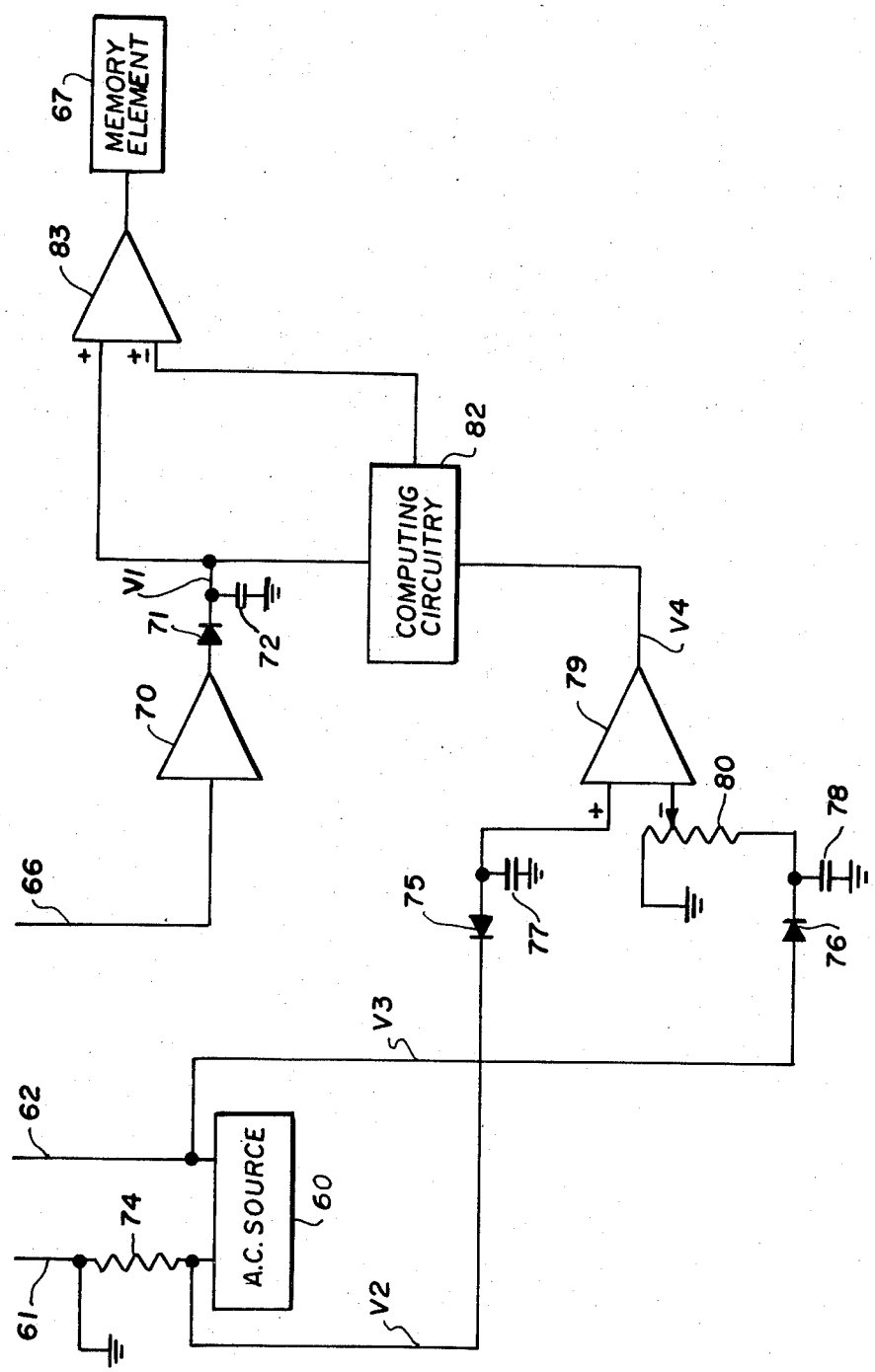
FIG. 4 is a schematic circuit diagram of an electrical compensating circuit used with the sensing device.

Oftentimes, the strip as it passes over the tension sensing device does not maintain a constant spatial relation with the device so that the air gap between the plane of the strip and the plane containing the core faces continually changes. Because the sensing device is basically an iron core inductor with an air gap, its impedance is dependent on the size of the air gap between the strip and core faces, as well as the permeability of the strip. Since impedance is directly proportional to voltage and inversely proportional to current, the voltage across the sensing device and the current through it are a measure of the impedance and hence a measure of the combined effects of air gap size and stress in the strip. Therefore, as the size of the air gap varies the voltages induced in the windings also vary so that the sum of the induced voltages does not accurately reflect strip tension. FIG. 4 illustrates apparatus which is used in correcting for such variations in air gap size.

The sum of the voltages induced in the windings is fed via lead 66 to amplifier 70 where it is amplified. Thereafter, the signal is rectified and filtered by diode 71 and capacitor 72, resulting in voltage $V_1$. Voltage $V_1$ comprises a first electrical signal which is a measure of both the stress in the ferromagnetic material being measured and the size of the air gap between the material and the measuring device. Means will now be described which adjusts $V_1$ to provide an adjusted electrical signal which is a measure of the stress and is independent of the size of the air gap.

A current-sensing resistor 74 is connected in series with the AC power supply and a voltage $V_2$ developed thereacross. When the supply is a constant current source $V_2$ is constant. The voltage $V_3$ across arrangement couples will, however, be a measure of the combined effect of air gap size and stress in the strip. Since it is desirable to measure the small variations in $V_3$ caused by these combined effects, the constant part of $V_3$ is subtracted out. This is done by using constant voltage $V_2$ as a bucking voltage. $V_2$ and $V_3$ are first rectified by diodes 75 and 76, respectively, filtered by capacitors 77 and 78, respectively, and bucked in amplifier 79 to produce a voltage $V_4$. A voltage divider 80 is employed to appropriately match the amplitudes of the rectified voltages $V_2$ and $V_3$. Amplifier 79, thus, places the voltage developed across the current sensing means 74 and the voltage developed across arrangement couples in bucking relation.

$V_4$ is proportional to air gap size and stress as is $V_1$, and, therefore, these two voltages being a function of the same two variables are combined in appropriate calculating or computing circuitry 82 to solve for a correction which when algebraically added to $V_1$ yields a measure of tension which is independent of the size of the air gap. The addition is carried out in amplifier 83 and the value stored in memory element 67. This corrective feature of the present invention can be more fully understood by referring to FIGS. 5, 6, and 7 of the drawings.

FIG. 5 is a series of curves which relate $V_1$ to the stress in cold rolled, low carbon steel strip for air gaps of 0.150 inch, 0.250 inch and 0.350 inch. FIG. 6 graphically illustrates the relationship between $V_4$ and air gap size for cold rolled, low carbon steel strip containing stresses of 5,000 and 20,000 psi. As can be seen, $V_4$ varies only slightly with variations in stress. The curves of FIGS. 5 and 6 are derived experimentally by applying known stresses to a sample of steel of the type being considered while measuring $V_1$ and $V_4$ with a voltmeter. This is done for various air gap sizes.

For practical purposes, $V_4$ can be considered as independent of stress. Adopting this assumption, for a system where the air gap is set at 0.250 inch, the relationships illustrated in FIG. 7 are derived from the curves of FIGS. 4 and 6. Thus, based on the values of $V_1$ and $V_4$ a correction is provided which when algebraically summed with $V_1$ results in a corrected $V_1$ which is representative of the stress in the strip. As illustrative of the above, consider the following example: The electromagnetic device is set 0.250 inch below the strip. At a particular instant during the passage of the strip over the device, $V_1$ read 4 volts and $V_4$ reads 5.2 volts. Referring to FIG. 7, it can be seen that for those values, the correction is —0.3 volts. Therefore, the corrected voltage is 3.7 volts. Because FIG. 7 is based on an air gap size of 0.250 inch as being the working air gap, reference is had to the 0.250 inch air gap curve of FIG. 5 where a voltage of 3.7 volts is representative of a stress of 10,500 psi. The same result is attained from a consideration of FIGS. 5 and 6, without the benefit of FIG. 7. Thus, from FIG. 6, when $V_4$ is 5.2 volts, the air gap is 0.20 inch; and from FIG. 5, when the air gap is 0.20 inch and $V_1$ is 4 volts, the stress is 10,500 psi.

This corrective action is incorporated into the present invention, for example, by providing an analog function generator as the computing circuitry 82. The function generator is programmed in accordance with FIG. 7 so that its output provides the correction voltage based on the $V_1$ and $V_4$ inputs. Such function generators and their method of operation are well known in the art. It is also possible to use presently available general purpose digital computers for computing circuitry 82. A computer can be programmed according to known techniques to solve for the simultaneous equations embodied in the curves of FIGS. 5 and 6. Alternatively, the computer can be programmed according to curves of FIG. 7 to provide an output which upon being converted by a digital to analog converter is applied to amplifier 83 as the correction voltage. It will be understood that where the working air gap size is set to be other than 0.250 inch, a different set of curves, like those of FIG. 7, is derived from FIGS. 5 and 6, using the other working air gap size as the reference base.

If the power supply is a constant voltage source, $V_2$ is a measure of air gap size and stress and $V_3$ is used as the bucking voltage. The use of $V_2$ as the bucking voltage to obtain $V_4$ is preferred, however. Since $V_2$ is a measure of sensor current, a small change in current causes a corresponding change in $V_2$ which cancels any changes in $V_3$ due to the current changes. $V_4$ is then independent of small current changes in the sensor supply.

As a modification of the apparatus of FIG. 4 either voltage $V_2$ or $V_3$, depending on whether a constant current or constant voltage power supply is employed, after being rectified, is filtered and fed directly to computing circuitry 82 without first subtracting out the constant portion thereof. Since the changes in voltage that occur as a result of changing air gap size are small, however, it is preferred to place $V_2$ and $V_3$ in bucking relationship so as to subtract out the constant portion of the voltages thereby giving a more accurate indication of the changes which occur.

I claim:

1. As part of a method of measuring the distribution of stresses in a given direction in a ferromagnetic material between two spaced locations on said material, the steps of establishing and dissipating one after another a series of abutting sets of magnetic flux flow paths extending from one of said locations to the other, each set of paths comprising first and second pairs of closed-loop magnetic flux flow paths, as each set paths is established passing one of the paths of each of the first and second pairs of paths through the material in said given direction and the other of the paths of each of the first and second pairs of paths through the material in the direction transverse to said given direction, passing said one of the paths of said first pair of paths and said other of the paths of said second pair of paths through a first magnetic core and coil arrangement in opposite directions to produce a resultant magnetic flux and induced voltage therein and passing said other of the paths of said first pair of paths and said one of the paths of said second pair of paths through a second magnetic core and coil arrangement in opposite directions to produce a resultant magnetic flux and induced voltage therein.

2. The method of claim 1 wherein the ferromagnetic material is a moving steel strip under tension, establishing the sets of magnetic flux flow paths across the width of the strip.

3. The method of claim 2 including establishing supplemental magnetic flux flow paths upon said abutting sets of flux flow paths, passing said supplemental paths through the strip in said given direction so as to increase the magnetic flux in the strip in that direction.

4. An electromagnetic device including two parallel rows of at least three magnetic core and coil arrangements in each row, each core of each arrangement having an end surface, said end surfaces lying in a common plane, each core being physically joined by magnetically conductive material to the cores immediately adjacent to it in its row and to a core in the opposite row with which latter core it and the coils associated therewith form a magnetic core and coil arrangement pair, the cores in each arrangement pair being so positioned with relation to one another that the line formed by the intersection of a plane entirely containing the longitudinal axes of both cores with said common plane is at a right angle to the line formed by the intersection of a plane entirely containing the longitudinal axes of all cores in either of said rows with said common plane, a source of alternating current, means connected to the coils of said arrangements and said source for delivering the alternating current sequentially to magnetic core and coil arrangement couples to produce magnetic flux flows therein, each arrangement coupled consisting of a first arrangement in one of said rows and a second arrangement in the other of said rows, which second arrangement is in the arrangement pair next to the first arrangement, and measuring means connected to the coils of said arrangements for measuring in conjunction with said sequential delivery of alternating current to arrangement couples the current induced in the coils of the arrangements which with the arrangement couples comprise arrangement pairs.

5. The device of claim 4 including a bias coil means positioned about the cores of one of said rows of arrangements.

6. The device of claim 5 wherein the longitudinal axes of the cores are parallel to one another, and adjacent cores in each row are equally spaced.

7. The device of claim 4 including current sensing means connected in series to the coils of said arrangements and to said source of alternating current, and bucking means connected to said current sensing means and to the coils of said arrangements for placing the voltage developed across the current sensing means and the voltage developed across arrangement couples, upon the delivery of alternating current to the couples, in bucking relation.

* * * * *